(12) United States Patent
Foreman

(10) Patent No.: US 11,778,548 B2
(45) Date of Patent: Oct. 3, 2023

(54) DEPLOYING CONTAINERS ON A 5G SLICE NETWORK

(71) Applicant: KYNDRYL, INC., New York, NY (US)

(72) Inventor: Park Foreman, Austin, TX (US)

(73) Assignee: KYNDRYL, INC., New York, NY (US)

( * ) Notice: Subject to any disclaimer, the term of this patent is extended or adjusted under 35 U.S.C. 154(b) by 102 days.

(21) Appl. No.: 17/196,047

(22) Filed: Mar. 9, 2021

(65) Prior Publication Data

US 2022/0295390 A1    Sep. 15, 2022

(51) Int. Cl.
| | |
|---|---|
| *H04W 8/20* | (2009.01) |
| *H04W 48/18* | (2009.01) |
| *H04W 72/0453* | (2023.01) |
| *H04W 48/16* | (2009.01) |
| *H04W 24/04* | (2009.01) |

(52) U.S. Cl.
CPC ........... *H04W 48/18* (2013.01); *H04W 24/04* (2013.01); *H04W 48/16* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 7,484,002 B2 | 1/2009 | Swildens | |
| 10,541,877 B2 | 1/2020 | Bainbridge | |
| 10,708,143 B2 | 7/2020 | Zhang | |
| 10,834,669 B2 | 11/2020 | Bordeleau | |
| 10,880,176 B2 | 12/2020 | Zhang | |
| 2002/0147611 A1* | 10/2002 | Greene | H04L 63/102 707/999.001 |
| 2005/0228888 A1* | 10/2005 | Mihm | G06F 8/65 709/227 |
| 2010/0309878 A1* | 12/2010 | Stolyar | H04L 67/142 370/331 |
| 2016/0232489 A1* | 8/2016 | Skaaksrud | H04L 67/10 |
| 2018/0077024 A1* | 3/2018 | Zhang | H04L 41/0896 |
| 2020/0244721 A1* | 7/2020 | S | H04L 63/0272 |
| 2023/0043362 A1* | 2/2023 | Kita | H04L 41/0806 |

FOREIGN PATENT DOCUMENTS

| | | | |
|---|---|---|---|
| KR | 101826498 B1 * | 2/2018 | |
| WO | 2018089417 A1 | 5/2018 | |
| WO | 2018127147 A1 | 7/2018 | |

OTHER PUBLICATIONS

Jiang_WO2017020612A1_pub.date_02-9-2017.pdf (Year: 2017).*

(Continued)

*Primary Examiner* — Charles N Appiah
*Assistant Examiner* — Alexander J Yi
(74) *Attorney, Agent, or Firm* — Dan Housley; Andrew M. Calderon; Calderon Safran & Cole, P.C.

(57) ABSTRACT

In an approach to deploying containers on a 5G slice network, responsive to receiving a request to obtain and host a container within a 5G network, a slice network is created within the 5G network for hosting of the container, where the slice network is created by a carrier for the 5G network. The container is deployed to one or more worker nodes using the slice network within the 5G network.

20 Claims, 11 Drawing Sheets

(56) References Cited

OTHER PUBLICATIONS

Afraz et al., "5G Network Slice Brokering: a Distributed Blockchain-Based Market", Conference Paper Apr. 2020, DOI: 10.1109/EuCNC48522.2020.9200915,pp. 1-6,<https://www.researchgate.net/publication/340777729>.
Disclosed Anonymously et al., "System and Method for Elastic Containerization of Software Defined Control Plane for a Software as a Service (SAAS) Offering", ip.com Prior Art Database Technical Disclosure, IPCOM000240513D, Feb. 4, 2015, pp. 1-4.
Disclosed Anonymously et al., "Single Root Input/Output Virtualization (SR-IOV) Based Function Slice Accelerator With Direct Memory Transfer", ip.com Prior Art Database Technical Disclosure, IPCOM000250070D, May 25, 2017, pp. 1-15.
Intel; "5G End-to-End Network Slicing", White Paper, 2019, pp. 1-7.
Jayakumar et al., Intel; "Why Use Containers and Cloud-Native Functions Anyway?", White Paper, 2019, pp. 1-10.
Sattar et al., "DSAF: Dynamic Slice Allocation Framework for 5G Core Network", May 9, 2019, arXiv:1905.03873v1 [cs.NI], pp. 1-6.

* cited by examiner

DEPLOYING CONTAINERS ON A 5G SLICE NETWORK

BACKGROUND

The present invention relates generally to the field of network-based applications, and more particularly to deploying containers on a 5G slice network.

A container is a standard unit of software that packages up code and all its dependencies, so the application runs quickly and reliably from one computing environment to another. A container image is a lightweight, standalone, executable package of software that includes everything needed to run an application: code, runtime, system tools, system libraries and settings. A container consists of an entire runtime environment: an application, plus all of its dependencies, libraries, and other binaries, and configuration files it needs to run, bundled into one package. By containerizing the application platform and its dependencies, differences in operating system distributions and underlying infrastructure are abstracted away.

In telecommunications, 5G is the fifth-generation technology standard for broadband cellular networks, which carriers began deploying worldwide in 2019, and is the planned successor to the 4G networks which provide connectivity to most current cellphones. 5G enables a new kind of network that is designed to connect virtually everyone and everything together including machines, objects, and devices. 5G wireless technology is meant to deliver higher multi-Gbps peak data speeds, ultra-low latency, more reliability, massive network capacity, increased availability, and a more uniform user experience to more users. Higher performance and improved efficiency empower new user experiences and connects new industries. 5G is much more than the next generation of wireless networks. 5G is the connectivity fabric that will weave everything and everyone together.

SUMMARY

Embodiments of the present invention disclose a method, a computer program product, and a system for deploying containers on a 5G slice network. In one embodiment, responsive to receiving a request to obtain and host a container within a 5G network, a slice network is created within the 5G network for hosting of the container, where the slice network is created by a carrier for the 5G network. The container is deployed to one or more worker nodes using the slice network within the 5G network.

DETAILED DESCRIPTION

The growth of 5G networks and cloud-container computing present an opportunity for better performance and lower bandwidth to serve resources to customers. It is common for a container to perform dedicated actions for a user in a particular part of the world distant from the central computing infrastructure. The present invention enables a container environment to extend closer to the customer for a temporary execution of one or more containers and is controlled through the carrier. This may be done for several reasons such as being closer to the source data or shortening the latency in interactions between the container code and the end user. The present invention associates with the telecom carrier 5G network to identify specific requests requiring a container function. The present invention is a computer-implemented method, computer program product, and system to adapt the container environment to extend itself into the 5G cloud upon request from the Network Functions Virtualization (NFV) of the Virtualized Infrastructure Manager (VIM) of the carrier.

In an embodiment, an agreement with a telecommunications carrier supporting a 5G network allows the 5G network to request, obtain and host a container on a worker node. This allows specific container images to execute, while configuring a pre-defined slice network for integration with the application provider's cluster. This may be achieved through one or a combination of a container system route controller, service controller or node controller hereinafter referred to as "controller." 5G network slicing is a network architecture that enables the multiplexing of virtualized and independent logical networks on the same physical network infrastructure. Each network slice is an isolated end-to-end network tailored to fulfill diverse requirements requested by a particular application. In an embodiment, the VIM of the 5G carrier will inform the master node, which has a function known as cloud controller-manager, of the application provider's cluster that a new container is required for a requested function and the VIM wishes to coordinate the network connection for the container. In response, the master node will create or cause to be available an appropriate network resource in the cluster.

In an embodiment, one or more container images are provided to the carrier for hosting via an interface with the carrier in support of the specific user request. A one-time request for information resources for the container image or images is provided in response.

The embodiments described below in FIGS. 2a, 2b, 3, 4a, 4b, 5, 6a, 6b, and 7 allow a third part to be the owner of an application and related updates on a subscription basis. The carrier can rely on the third party to deploy current code and features. The Continuous Integration and Continuous Delivery (CICD) pipeline of the software supplier serves one or more carrier VIMs as software service consumers.

Figure 1:
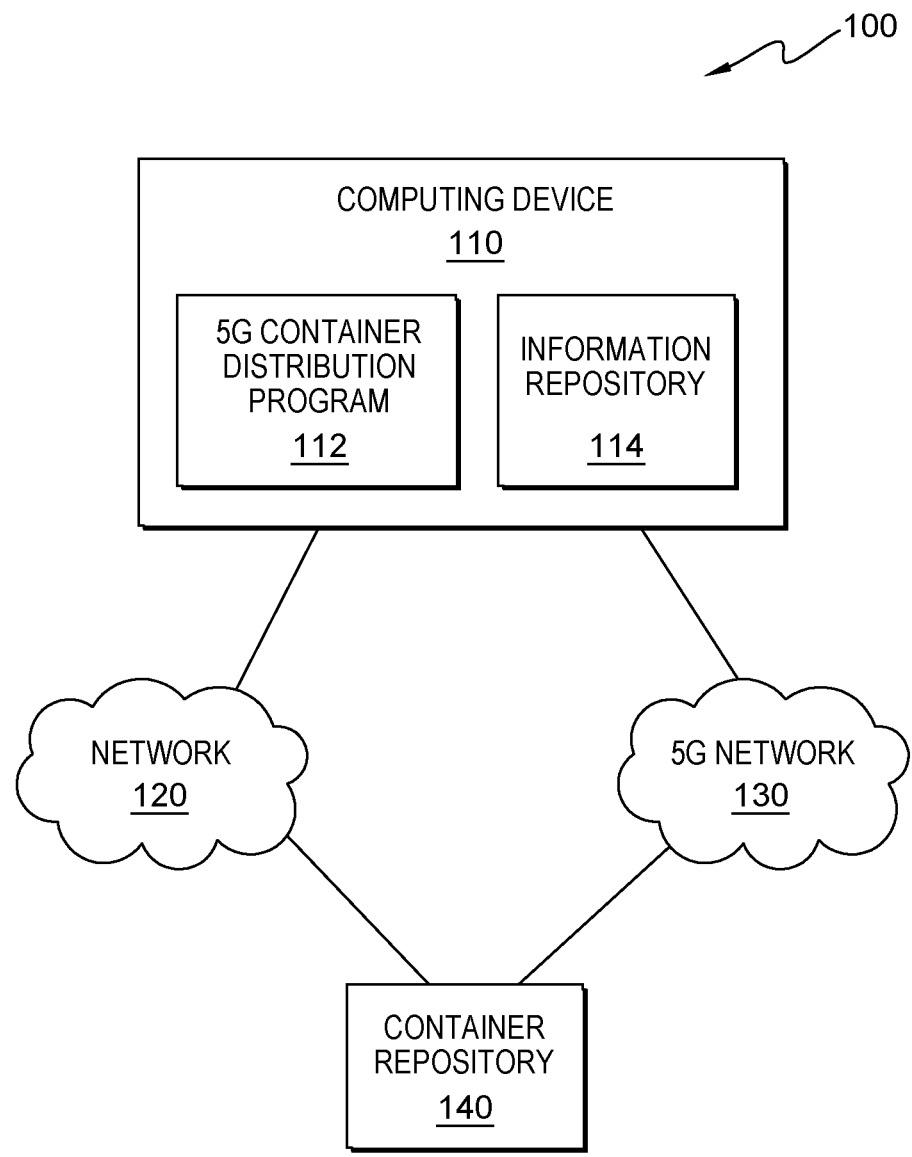
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of 5G container distribution program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and container repository 140, both connected to network 120 and 5G network 130. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100. 5G network 130 is a network using 5G technology that allows deployment of containers to worker nodes.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes 5G container distribution program 112. In an embodiment, 5G container distribution program 112 is a program, application, or subprogram of a larger program for deploying containers on a 5G slice network. In an alternative embodiment, 5G container distribution program 112 may be located on any other device accessible by computing device 110 via network 120.

In an embodiment, computing device 110 includes information repository 114. In an embodiment, information repository 114 may be managed by 5G container distribution program 112. In an alternate embodiment, information repository 114 may be managed by the operating system of the device, alone, or together with, 5G container distribution program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, VIM configuration data, container configuration data, 5G network configuration data, slice network data, software data, container network security configuration data, user data, system configuration data, and other data that is received by 5G container distribution program 112 from one or more sources, and data that is created by 5G container distribution program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Container repository 140 is a data storage that stores all containers that can be distributed by the 5G container distribution program. In some embodiments, container repository 140 is owned by the supplier of containers (the seller) who independently enforces container usage contracts with the consumer (the carrier or the customer of the carrier). Container repository 140 can accept, reject, log and monitor consumption of containers (perhaps within the bounds of any contractual arrangement with the carrier). In an embodiment, this information could further be used for billing in another system.

Figure 2A:
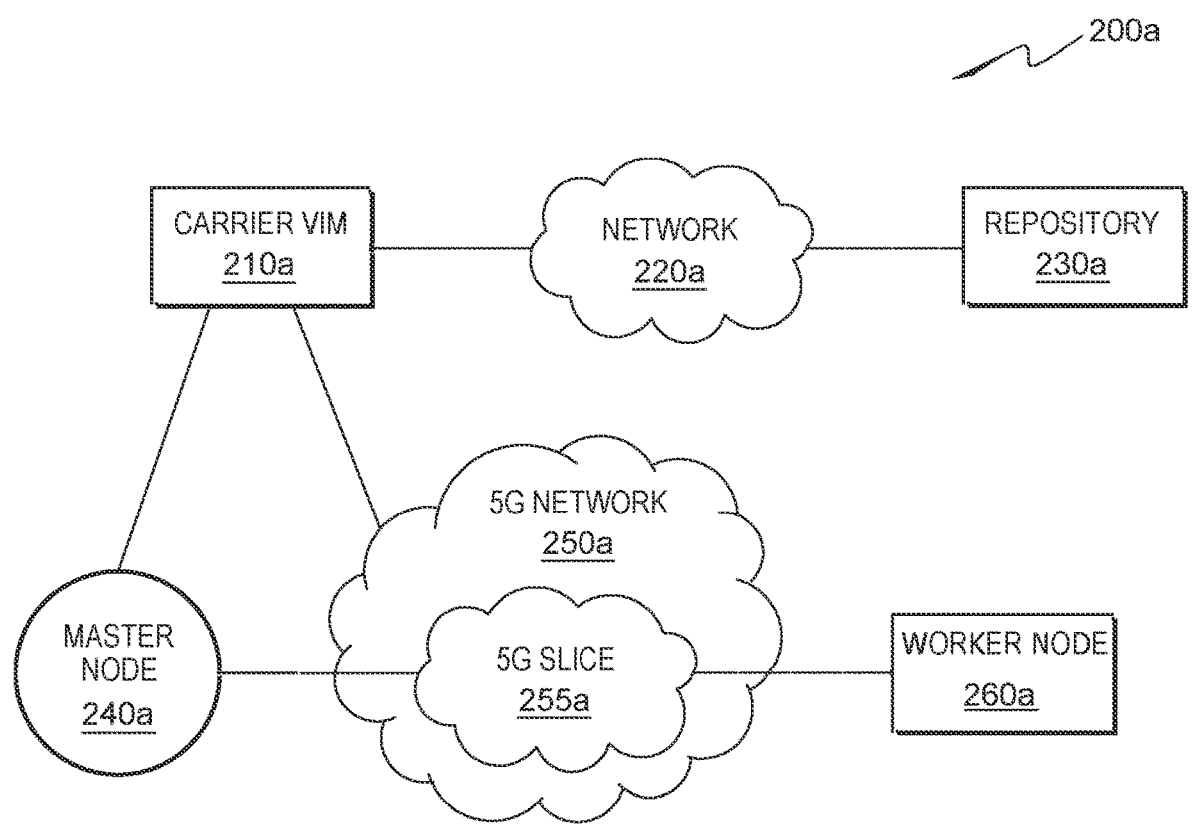
FIG. 2a depicts a block diagram for an embodiment of the 5G container distribution program that uses the pull method to deliver a container, in accordance with an embodiment of the present invention.

FIG. 2a depicts a block diagram for an embodiment of the 5G container distribution program that uses the pull method to deliver a container, generally designated 200a, in accordance with an embodiment of the present invention. In this embodiment, the carrier VIM will inform the container request engine through a message that one or more containers are required to use within the 5G network.

This system includes Carrier VIM 210a. Carrier VIM 210a is responsible for controlling and managing the compute, storage, and network resources of the NFV, usually within infrastructure domain of a carrier or operator. Carrier VIM 210a connects to Repository 230a via Network 220a. Network 220a is a network, e.g., network 120 from FIG. 1, that is used for out-of-band communications between carrier VIM 210a and repository 230a.

Repository 230a is a data storage that stores all containers that can be distributed by the 5G container distribution program. In some embodiments, repository 230a is owned by the supplier of containers (the seller) who independently enforces container usage contracts with the consumer (the carrier). Repository 230a can accept, reject, log and monitor consumption of containers (perhaps within the bounds of any contractual arrangement with the carrier). In an embodiment, this information could further be used for billing in another system. Master Node 240a is the node which controls and manages a set of worker nodes in a container environment.

Carrier VIM 210a also connects to 5G Network 250a. 5G Network 250a is a 5G network that allows the carrier to request, obtain and host a container on a worker node for specific container images to execute while configuring a pre-defined slice network for integration with the application provider's cluster. 5G Network 250a contains 5G Slice 255a, which is a virtual network on 5G network 250a created by carrier VIM 210a between master node 240a and worker node 260a. 5G slice 255a connects master node 240a to Worker Node 260a. Worker node 260a is an instance of the application environment that executes containers. Worker node 260a may be a virtual or physical machine, depending on the cluster configuration. Each worker node is managed by master node 240a.

Figure 2B:
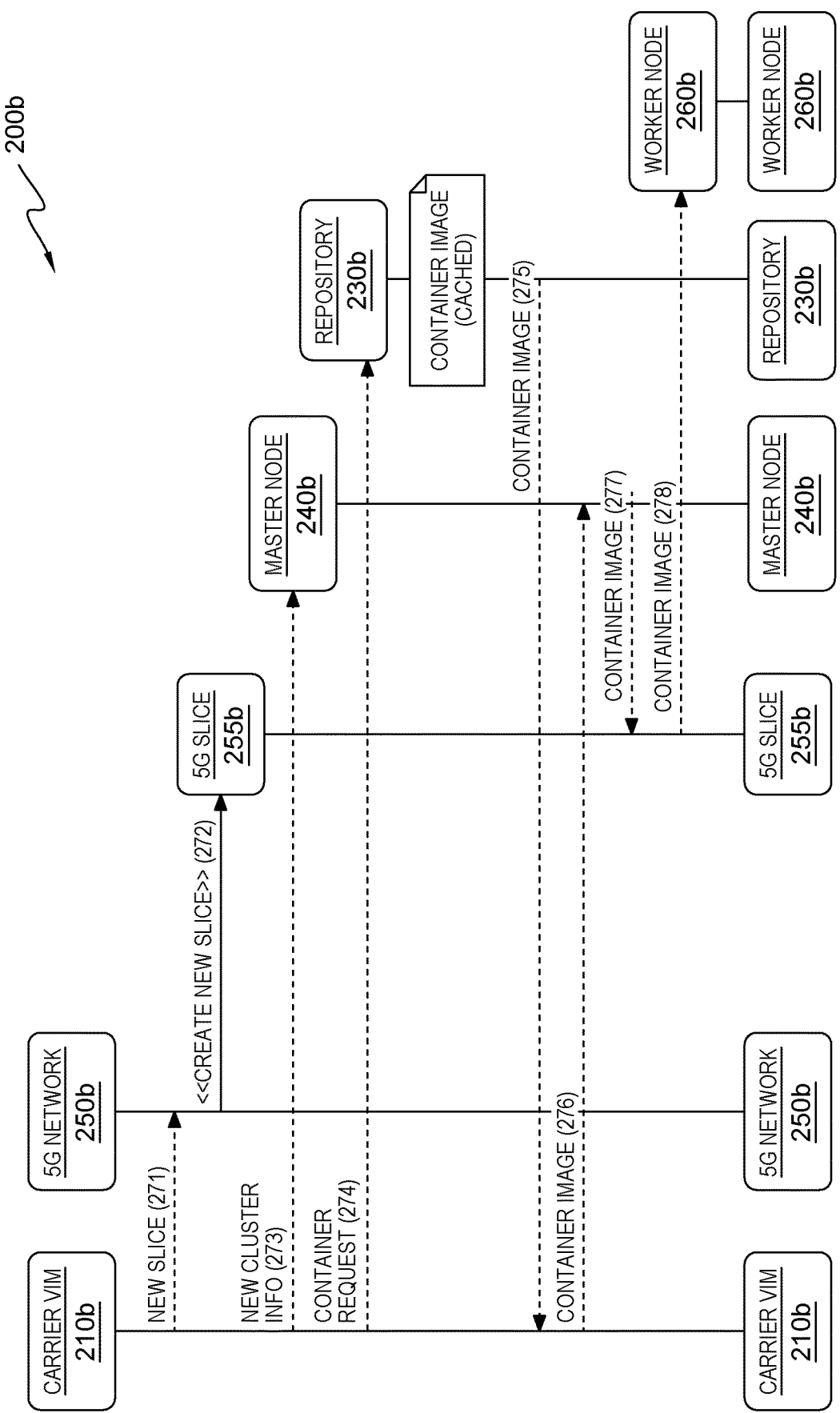
FIG. 2b depicts a sequence diagram for an embodiment of 5G container distribution program 112 that uses the pull method to deliver a container, using the system described in FIG. 2a, in accordance with an embodiment of the present invention.

FIG. 2b depicts a sequence diagram for an embodiment of 5G container distribution program 112 that uses the pull method, generally designated 200b, to deliver a container using the system described in FIG. 2a, in accordance with an embodiment of the present invention. Pull method 200b includes Carrier VIM 210b, which is carrier VIM 210a from FIG. 2a; Repository 230b, which is repository 230a from FIG. 2a; Master Node 240b, which is master node 240a from FIG. 2a; 5G Network 250b, which is 5G network 250a from FIG. 2a; 5G Slice 255b, which is 5G slice 255a from FIG. 2a; and Worker Node 260b, which is worker node 260a from FIG. 2a.

In steps 271 and 272, 5G network slice 255b is created on 5G network 250b by carrier VIM 210b. In step 273, carrier VIM 210b sends the new cluster information, i.e., for network slice 255b, to master node 240b. In step 274, carrier VIM 210b sends a request for a container to repository 230b. Upon confirming acceptance from the VIM of the container pull, a container image is created or made available from a repository 230b. In this case, the VIM acts as a proxy or arbitrator of the container to the container environment.

In step 275, the carrier (possibly via carrier VIM 210a) then obtains a reference or cached copy of the container from an authorized repository, i.e., repository 230b in this embodiment, and begins deployment according to provided configuration parameters. If required, carrier VIM 210a will establish a slice network for communication between the repository and the application environment which may include the master node and multiple worker nodes. In step 276, carrier VIM 210b sends the container image to master node 240b. In steps 277 and 278, master node 240b sends the container image to worker node 260b via 5G network slice 255b, and the deployment of the container is complete.

In another embodiment of FIG. 2b (not shown), carrier VIM 210a creates a separate 5G slice (still referred to as 255b) for the master node 240a to pull the container image from repository 230a and deploys the container image to worker 260a over the separate 5g slice 255b.

Figure 3:
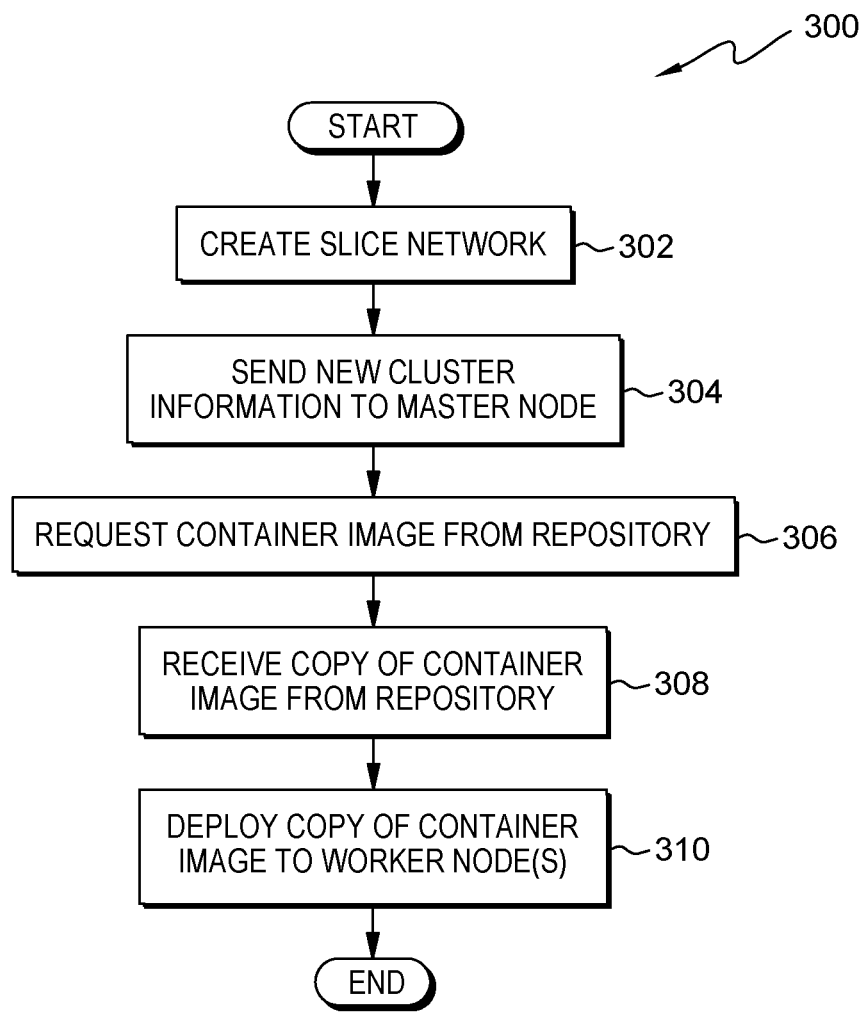
FIG. 3 is a flowchart depicting operational steps for the procedure performed by the 5G container distribution program to deploy a container over a 5G slice network using the pull method, in accordance with an embodiment of the present invention.

FIG. 3 is a flowchart depicting operational steps for the procedure performed by 5G container distribution program 112 to deploy a container over a 5G slice network using the pull method, in accordance with at least one embodiment of the present invention. In an alternative embodiment, the steps of workflow 300 may be performed by any other program while working with 5G container distribution program 112.

In an embodiment, 5G container distribution program 112 creates a slice network on the 5G network, e.g., 5G network 250a from FIG. 2a. In an embodiment, 5G container distribution program 112 sends the new cluster information for the new slice network to the master node, e.g., master node 240a from FIG. 2a. In an embodiment, 5G container distribution program 112 requests the desired container from the repository, e.g., repository 230a from FIG. 2a. In an embodiment, this request is sent out of band via the out-of-band network, e.g., network 220a from FIG. 2a. In an embodiment, 5G container distribution program 112 receives a reference or cached copy of the container image from the repository, e.g., repository 230a from FIG. 2a. In an embodiment, 5G container distribution program 112 deploys the container image to the worker node(s), e.g., worker node 260a from FIG. 2a, using the master node containing a cloud controller manager and the 5G slice network created in step 302. 5G container distribution program 112 then ends for this cycle.

It should be appreciated that embodiments of the present invention provide at least for the procedure performed by 5G container distribution program 112 to deploy a container over a 5G slice network using the pull method. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

5G container distribution program 112 creates a slice network (step 302). In an embodiment, 5G container distribution program 112 creates a slice network on the 5G network, e.g., 5G network 250a from FIG. 2a. In an embodiment, 5G container distribution program 112 uses the VIM, e.g., carrier VIM 210a from FIG. 2a, to create the slice network.

5G container distribution program 112 sends the new cluster information to the master node (step 304). In an embodiment, 5G container distribution program 112 sends the new cluster information for the new slice network to the master node, e.g., master node 240a from FIG. 2a.

5G container distribution program 112 requests the container image from the repository (step 306). In an embodiment, 5G container distribution program 112 requests the desired container from the repository, e.g., repository 230a from FIG. 2a. In an embodiment, this request is sent out of band via the out-of-band network, e.g., network 220a from FIG. 2a.

5G container distribution program 112 receives a copy of the container image from the repository (step 308). In an embodiment, 5G container distribution program 112 receives a container image from the repository, e.g., repository 230a from FIG. 2a.

5G container distribution program 112 deploys the copy of the container image to the worker node(s) (step 310). In an embodiment, 5G container distribution program 112 deploys the container image to the worker node(s), e.g., worker node 260a from FIG. 2a, using the master node and the 5G slice network created in step 302. 5G container distribution program 112 then ends for this cycle.

Figure 4A:
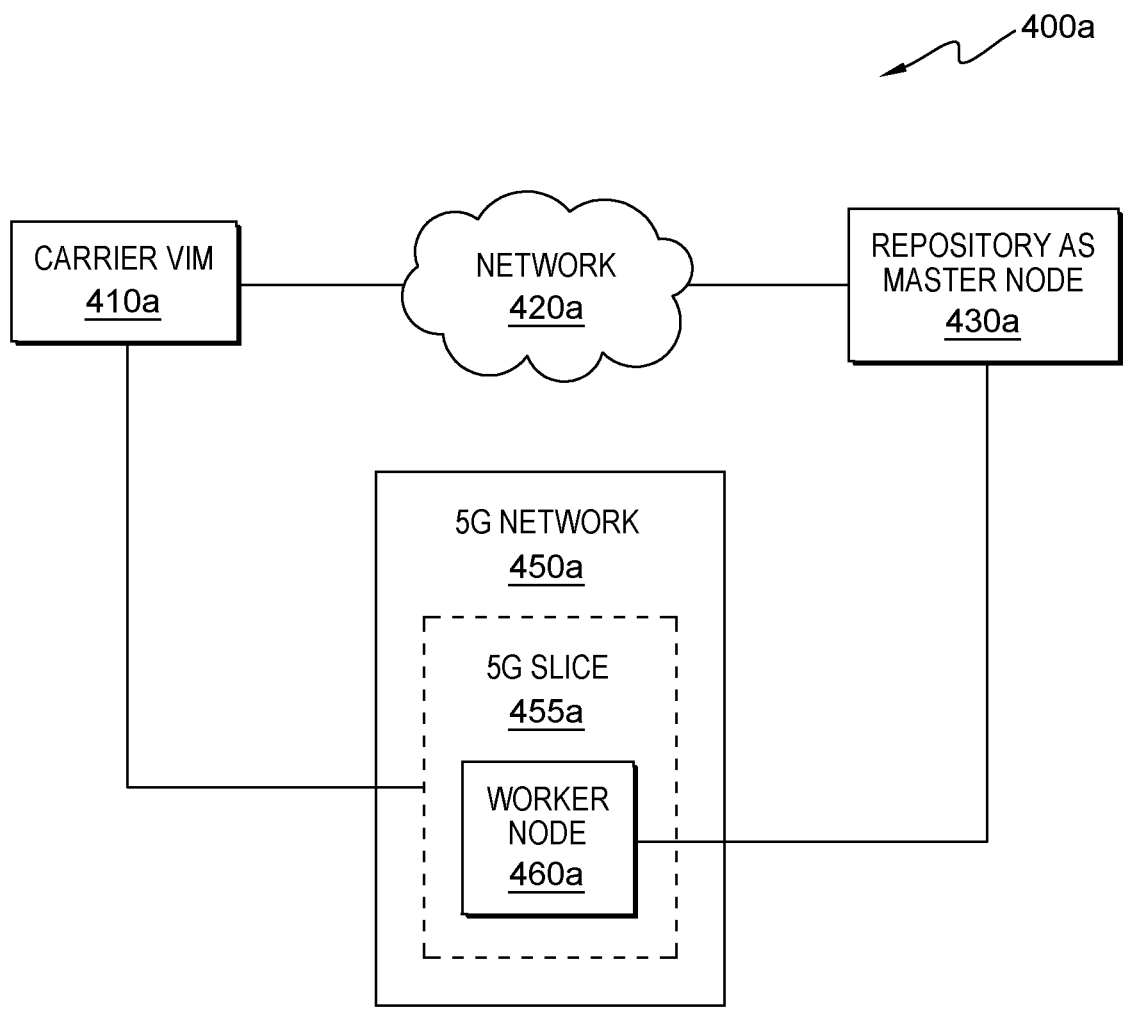
FIG. 4a depicts a block diagram for an embodiment of the 5G container distribution program that uses the push method to deliver a container, in accordance with an embodiment of the present invention.

FIG. 4a depicts a block diagram for an embodiment of the 5G container distribution program that uses the push method to deliver a container, generally designated 400a, in accordance with an embodiment of the present invention. This system includes Carrier VIM 410a. Carrier VIM 410a is responsible for controlling and managing the compute, storage, and network resources of the Network Functions Virtualization (NFV), usually within infrastructure domain of a carrier or operator. Carrier VIM 410a connects to Repository as the Master Node 430a via Network 420a. Network 420a is a network, e.g., network 120 from FIG. 1, that is used for out-of-band communications between carrier VIM 410a and repository as the master node 430a.

Repository as the master node 430a is a data storage that stores all containers that can be distributed by the 5G container distribution program. In some embodiments, repository as the master node 430a is owned by the supplier of containers (the seller) who independently enforces container usage contracts with the consumer (the carrier). Repository as the master node 430a can accept, reject, log and monitor consumption of containers (perhaps within the bounds of any contractual arrangement with the carrier). In an embodiment, this information could further be used for billing in another system. Repository as the master node 430a is the node which controls and manages a set of worker nodes in a container environment. Repository as the master node 430a provides the cloud controller manager functions over the 5G slice.

Carrier VIM 410a also connects to 5G Network 450a. 5G Network 450a is a 5G network that allows the carrier to request, obtain and host a container on a worker node for specific container images to execute while configuring a pre-defined slice network for integration with the application provider's cluster. 5G Network 450a contains 5G Slice 455a, which is a virtual network on 5G network 450a created by carrier VIM 410a between repository as the master node 430a and worker node 460a. 5G network slicing is a network architecture that enables the multiplexing of virtualized and independent logical networks on the same physical network infrastructure. Each network slice is an isolated end-to-end network tailored to fulfil diverse requirements requested by a particular application. In this embodiment, worker node 460a is contained within 5G slice 455a, and the container is deployed directly to worker node 460a from repository as the master node 430a via 5G slice 455a. Worker node 460a is an instance of the application environment that executes containers. Worker node 460a may be a virtual or physical machine, depending on the cluster configuration. Each worker node is managed by repository as the master node 430a.

Figure 4B:
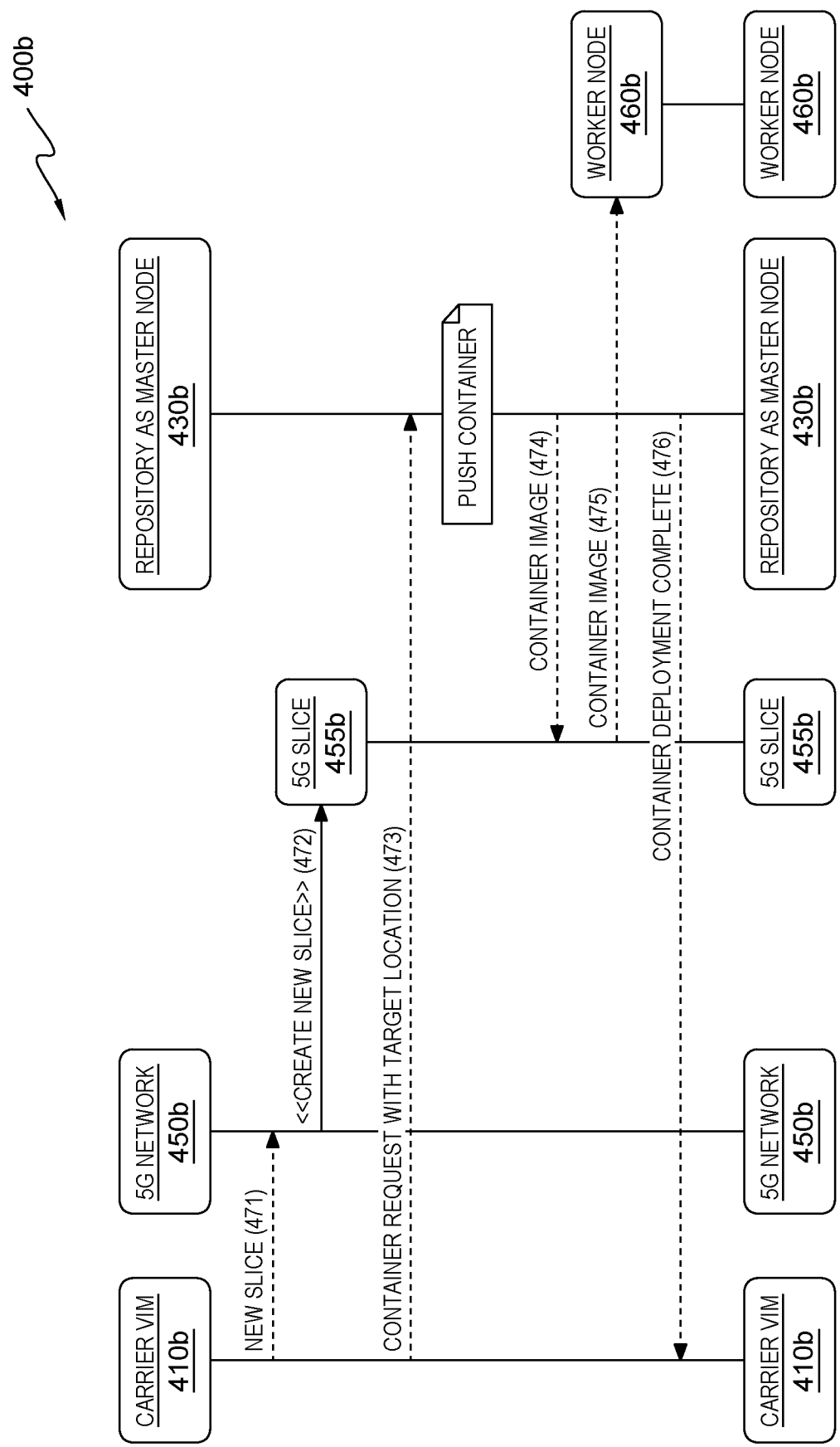
FIG. 4b depicts a sequence diagram for an embodiment of 5G container distribution program that uses the push method to deliver a container, using the system described in FIG. 4a, in accordance with an embodiment of the present invention.

FIG. 4b depicts a sequence diagram for an embodiment of 5G container distribution program 112 that uses the push method, generally designated 400b, to deliver a container using the system described in FIG. 4a, in accordance with an embodiment of the present invention. Push method 400b includes Carrier VIM 410b, which is carrier VIM 410a from FIG. 4a; Repository as the Master Node 430b, which is repository as the master node 430a from FIG. 4a; 5G Network 450b, which is 5G network 450a from FIG. 4a; 5G Slice 455b, which is 5G slice 455a from FIG. 4a; and Worker Node 460b, which is worker node 460a from FIG. 4a.

In steps 471 and 472, 5G network slice 455b is created on 5G network 450b by carrier VIM 410b. In step 473, carrier VIM 410b sends a request over any out-of-band network for a container to repository as the master node 430b. In this embodiment, the request includes the location (address) of the target for the container since repository as the master node 430b will push the container directly to worker node 460b via 5G slice 455b. In steps 474 and 475, repository as the master node 430b sends the container image to worker node 460b via 5G slice 455b. In step 476, repository as the master node 430b sends an out-of-band message via network 420b (not shown) to carrier VIM 410b to notify the VIM that the container has been deployed directly from the repository to the one or more worker nodes using 5G slice 455b.

Figure 5:
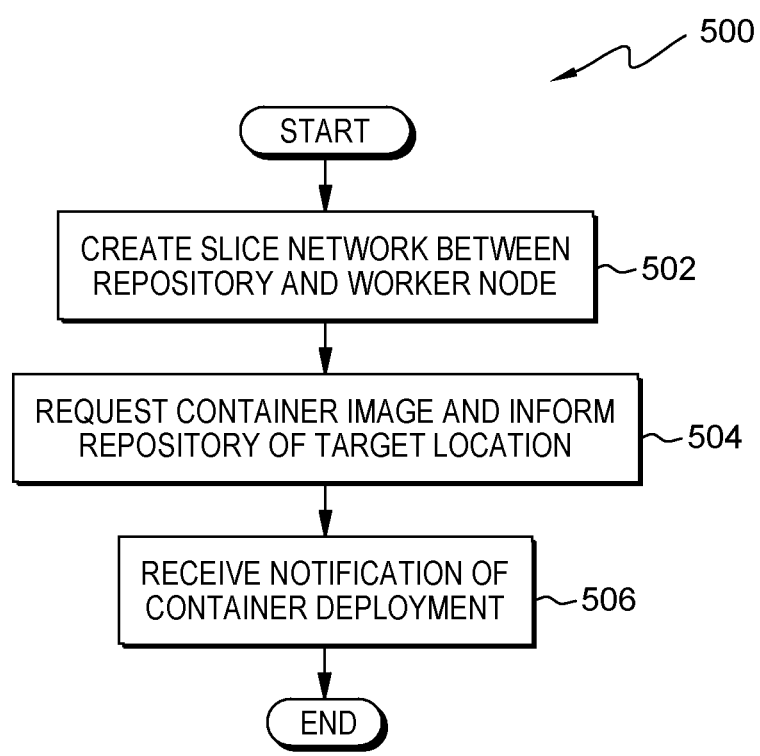
FIG. 5 is a flowchart depicting operational steps for the procedure performed by the 5G container distribution program to deploy a container over a 5G slice network using the push method, in accordance with an embodiment of the present invention.

FIG. 5 is a flowchart depicting operational steps for the procedure performed by the 5G container distribution program to deploy a container over a 5G slice network using the push method, in accordance with an embodiment of the present invention. In an alternative embodiment, the steps of workflow 500 may be performed by any other program while working with 5G container distribution program 112.

In an embodiment, 5G container distribution program 112 creates a slice network on the 5G network, e.g., 5G network 450a from FIG. 4a, between the repository (which is acting as a master node), e.g., repository as the master node 430a from FIG. 4a, and the worker node, e.g., worker node 460a from FIG. 4a. In an embodiment, 5G container distribution program 112 requests the container image from the repository and informs the repository of the location of the worker node. In an embodiment, 5G container distribution program 112 receives a notification from the repository that the container has been deployed to the worker node. 5G container distribution program 112 then ends for this cycle.

It should be appreciated that embodiments of the present invention provide at least for the procedure performed by 5G container distribution program 112 to deploy a container over a 5G slice network using the push method. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

5G container distribution program 112 creates a slice network between the repository and the worker node (step 502). In an embodiment, 5G container distribution program 112 creates a slice network on the 5G network, e.g., 5G network 250a from FIG. 2a, between the repository (which is acting as a master node), e.g., repository as the master node 430a from FIG. 4a, and the worker node, e.g., worker node 460a from FIG. 4a.

5G container distribution program 112 requests a container image and informs the repository of the target location (step 504). In an embodiment, 5G container distribution program 112 requests the container image from the repository and informs the repository of the location of the worker node. In this embodiment, the repository will deploy the container directly to the worker node, so the repository requires the location in the request. In an embodiment, the repository deploys the requested container to the worker node via the 5G slice network.

5G container distribution program 112 receives notification of the container deployment (step 506). In an embodiment, 5G container distribution program 112 receives a notification from the repository that the container has been deployed to the worker node. 5G container distribution program 112 may be configured to maintain or optionally remove the slice network between the repository and the worker node depending on operational needs. 5G container distribution program 112 then ends for this cycle.

Figure 6A:
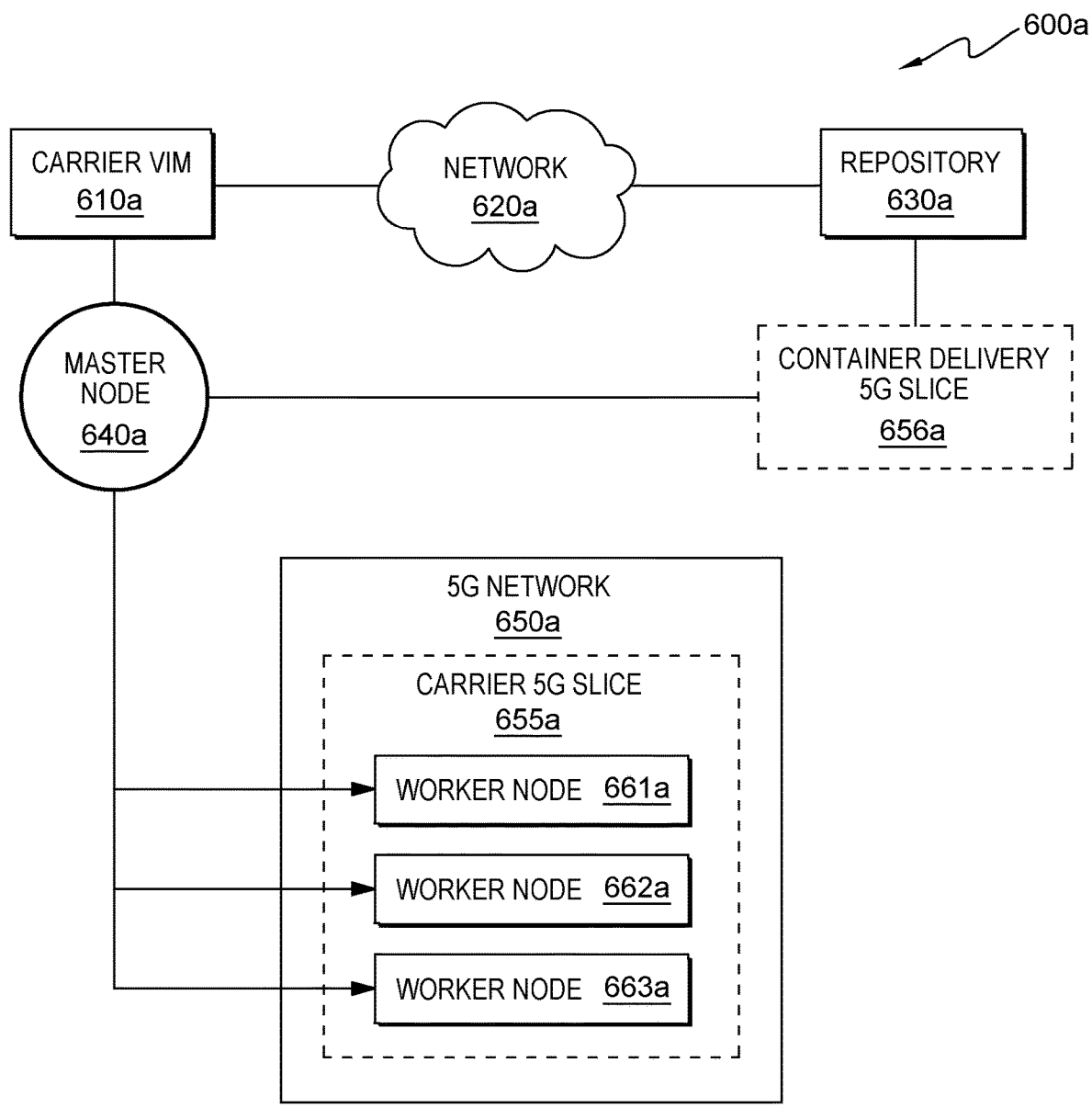
FIG. 6a depicts a block diagram for an embodiment of the 5G container distribution program that uses an alternate push method to deliver a container, in accordance with an embodiment of the present invention.

FIG. 6a depicts a block diagram for an embodiment of the 5G container distribution program that uses an alternate push method to deliver a container, generally designated 600a, in accordance with an embodiment of the present invention. This system includes Carrier VIM 610a. Carrier VIM 610a is responsible for controlling and managing the compute, storage, and network resources of the Network Functions Virtualization (NFV), usually within infrastructure domain of a carrier or operator. Carrier VIM 610a connects to Repository 630a via Network 620a. Network 620a is a network, e.g., network 120 from FIG. 1, that is used for out-of-band communications between carrier VIM 610a and repository 630a.

Repository 630a is a data storage that stores all containers that can be distributed by the 5G container distribution program. In some embodiments, repository 630a is owned by the supplier of containers (the seller) who independently enforces container usage contracts with the consumer (the carrier). Repository 630a can accept, reject, log and monitor consumption of containers (perhaps within the bounds of any contractual arrangement with the carrier). In an embodiment, this information could further be used for billing in another system. Master Node 640a is the node which controls and manages a set of worker nodes in a container environment. Repository 630a connects to master node 640a via Container Delivery 5G Slice 656a, which is a virtual network on 5G network 650a created by carrier VIM 610a between repository 630a and master node 640a. In this embodiment, the container is deployed to worker nodes 661a-663a via container delivery 5G slice 656a.

Carrier VIM 610a also connects to 5G Network 650a. 5G Network 650a is a 5G network that allows the carrier to request, obtain and host a container on a worker node for specific container images to execute while configuring a pre-defined slice network for integration with the application provider's cluster. 5G Network 650a contains 5G Slice 655a, which is a virtual network on 5G network 650a created by carrier VIM 610a between master node 640a and Worker Nodes 661a-663a. 5G network slicing is a network architecture that enables the multiplexing of virtualized and independent logical networks on the same physical network infrastructure. Each network slice is an isolated end-to-end network tailored to fulfil diverse requirements requested by a particular application. Worker nodes 661a-663a are an instance of the application environment that executes containers. Worker nodes 661a-663a may be virtual or physical machines, depending on the cluster configuration. Each worker node is managed by master node 640a.

Figure 6B:
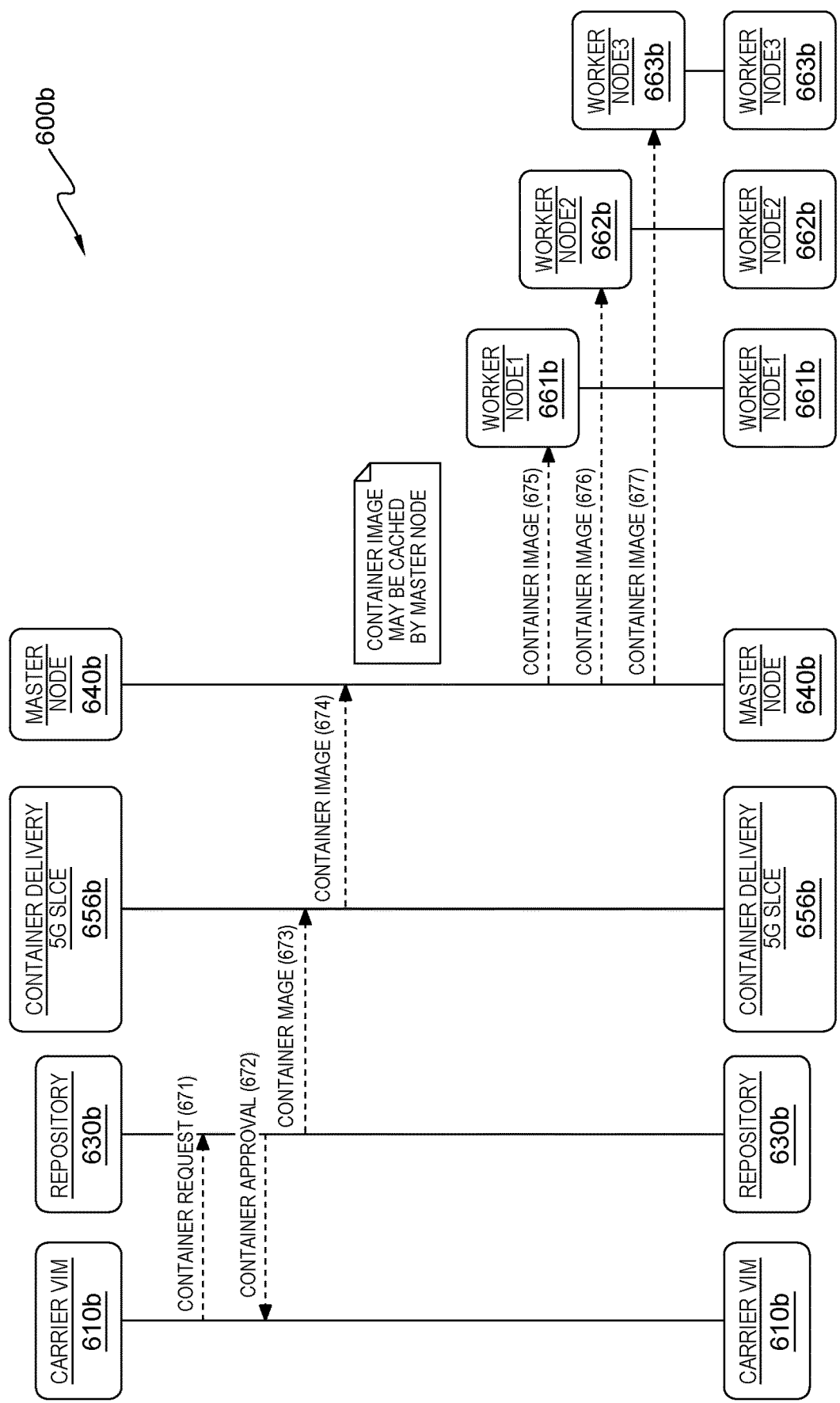
FIG. 6b depicts a sequence diagram for an embodiment of 5G container distribution program 112 that uses an alternate push method to deliver a container, using the system described in FIG. 4a, in accordance with an embodiment of the present invention.

FIG. 6b depicts a sequence diagram for an embodiment of 5G container distribution program 112 that uses an alternate push method, generally designated 600b, to deliver a container using the system described in FIG. 6a, in accordance with an embodiment of the present invention. Alternate push method 600b includes Carrier VIM 610b, which is carrier VIM 610a from FIG. 6a; Repository 630b, which is repository 630a from FIG. 6a; Master Node 640b, which is master node 640a from FIG. 6a; Container Delivery 5G Slice 656b, which is container delivery 5G slice 656a from FIG. 6a; and Worker Nodes 661b-663b, which are worker nodes 661a-663a from FIG. 6a.

In step 671, carrier VIM 610b sends a request for a container delivery to repository 630b which determines if the request in in compliance with agreed upon parameters. In step 672, carrier VIM 610b receives an approval for the container delivery from repository 630b. In steps 673 and 674, master node 640b receives the container image from repository 630b via container delivery 5G slice 656b. In some embodiments, this container image may be cached by the master node for efficiency. In step 675-677, master node 640b deploys the container image to worker nodes 661b-663b, respectively, and the deployment of the container is complete.

Figure 7:
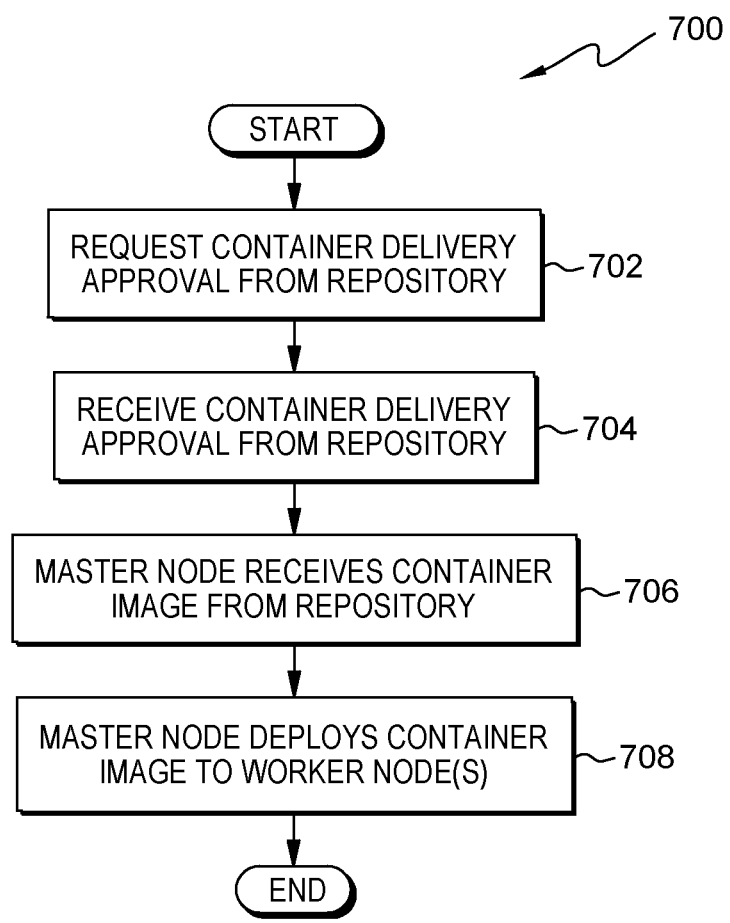
FIG. 7 is a flowchart depicting operational steps for the procedure performed by the 5G container distribution program to deploy a container over a 5G slice network using an alternate push method, in accordance with an embodiment of the present invention.

FIG. 7 is a flowchart depicting operational steps for the procedure performed by the 5G container distribution program to deploy a container over a 5G slice network using an alternate push method, in accordance with an embodiment of the present invention. In an alternative embodiment, the steps of workflow 700 may be performed by any other program while working with 5G container distribution program 112.

In an embodiment, 5G container distribution program 112 requests approval from the repository, e.g., repository 630a from FIG. 6a, to deploy a container to worker node(s), e.g., worker nodes 660a-661a from FIG. 6a. In an embodiment, 5G container distribution program 112 receives the approval to deploy the container from the repository. In an embodiment, if the desired container is not cached in the master node, then 5G container distribution program 112 receives the desired container from the repository, into the master node. In an embodiment, 5G container distribution program 112 deploys the container using the master node via the 5G slice to the worker nodes. 5G container distribution program 112 then ends for this cycle.

It should be appreciated that embodiments of the present invention provide at least for the procedure performed by the 5G container distribution program to deploy a container over a 5G slice network using an alternate push method. However, FIG. 7 provides only an illustration of one implementation and does not imply any limitations with regard to the environments in which different embodiments may be implemented. Many modifications to the depicted environment may be made by those skilled in the art without departing from the scope of the invention as recited by the claims.

5G container distribution program 112 requests container delivery approval from the repository (step 702). In an embodiment, 5G container distribution program 112 requests approval from the repository, e.g., repository 630a from FIG. 6a, to deploy a container to worker node(s), e.g., worker nodes 660a-661a from FIG. 6a. In this embodiment, the container image may be cached by the master node, thereby avoiding having to receive the container image from the repository. In this embodiment, therefore, container distribution program 112 must get approval from the repository before deploying the container.

In an embodiment, repository 630a may apply business logic in the approval process such as determining the permitted number of deployments, rate of usage, functionality restrictions associated with the properties of the container, and usage limitation agreements with the owner of the requesting party.

5G container distribution program 112 receives container delivery approval from the repository (step 704). In an embodiment, 5G container distribution program 112 receives the approval to deploy the container from the repository.

5G container distribution program 112 master node receives the container image from the repository (step 706). In an embodiment, if the desired container is not cached in the master node, then 5G container distribution program 112 receives the desired container from the repository, into the master node. In an embodiment, if the master node already has a cached copy of the desired container, then container distribution program 112 may receive approval for additional deployment from the cache using a number of methods, e.g., a simple indicator of approval in a record or the return of a cryptographic key allowing the master node to decrypt and deploy the container from the cache.

5G container distribution program 112 master node deploys the container image to the worker node(s) (step 708). In an embodiment, 5G container distribution program 112 deploys the container using the master node via the 5G slice to the worker nodes. 5G container distribution program 112 then ends for this cycle.

Figure 8:
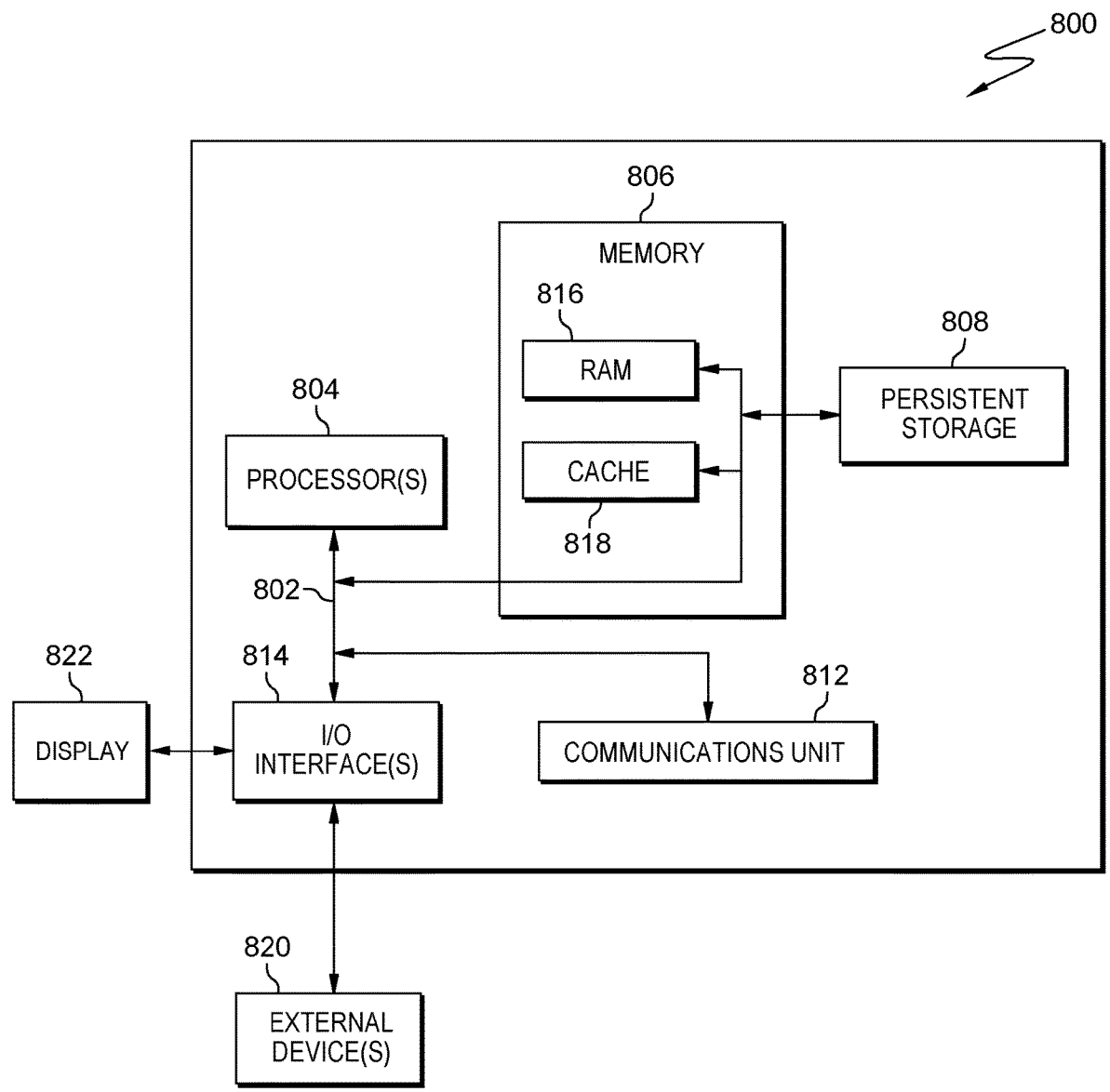
FIG. 8 depicts a block diagram of components of the computing devices executing the 5G container distribution program within the distributed data processing environment of FIG. 1, in accordance with an embodiment of the present invention.

FIG. 8 is a block diagram depicting components of computing device 110 suitable for 5G container distribution program 112, in accordance with at least one embodiment of the invention. FIG. 8 displays computer 800; one or more processor(s) 804 (including one or more computer processors); communications fabric 802; memory 806, including random-access memory (RAM) 816 and cache 818; persistent storage 808; communications unit 812; I/O interfaces 814; display 822; and external devices 820. It should be appreciated that FIG. 8 provides only an illustration of one embodiment and does not imply any limitations with regard to the environments in which different embodiments may be implemented. Many modifications to the depicted environment may be made.

As depicted, computer 800 operates over communications fabric 802, which provides communications between computer processor(s) 804, memory 806, persistent storage 808, communications unit 812, and I/O interface(s) 814. Communications fabric 802 may be implemented with any architecture suitable for passing data or control information between processors 804 (e.g., microprocessors, communications processors, and network processors), memory 806, external devices 820, and any other hardware components within a system. For example, communications fabric 802 may be implemented with one or more buses.

Memory 806 and persistent storage 808 are computer readable storage media. In the depicted embodiment, memory 806 comprises RAM 816 and cache 818. In general, memory 806 can include any suitable volatile or non-volatile computer readable storage media. Cache 818 is a fast memory that enhances the performance of processor(s) 804 by holding recently accessed data, and near recently accessed data, from RAM 816.

Program instructions for 5G container distribution program 112 may be stored in persistent storage 808, or more generally, any computer readable storage media, for execution by one or more of the respective computer processors 804 via one or more memories of memory 806. Persistent storage 808 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 812, in these examples, provides for communications with other data processing systems or devices. In these examples, communications unit 812 includes one or more network interface cards. Communications unit 812 may provide communications through the use of either or both physical and wireless communications links. In the context of some embodiments of the present invention, the source of the various input data may be physically remote to computer 800 such that the input data may be received, and the output similarly transmitted via communications unit 812.

I/O interface(s) 814 allows for input and output of data with other devices that may be connected to computer 800. For example, I/O interface(s) 814 may provide a connection to external device(s) 820 such as a keyboard, a keypad, a touch screen, a microphone, a digital camera, and/or some other suitable input device. External device(s) 820 can also include portable computer readable storage media such as, for example, thumb drives, portable optical or magnetic disks, and memory cards. Software and data used to practice embodiments of the present invention, e.g., 5G container distribution program 112, can be stored on such portable computer readable storage media and can be loaded onto persistent storage 808 via I/O interface(s) 814. I/O interface(s) 814 also connect to display 822.

Display 822 provides a mechanism to display data to a user and may be, for example, a computer monitor. Display 822 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
responsive to receiving a request by a carrier to obtain and host a container within a 5G network, creating, by one or more computer processors, a slice network within the 5G network for hosting of the container, wherein the slice network is created by the carrier for the 5G network, the carrier being a telecommunications carrier, and wherein the container comprises a standalone runtime environment including code and dependencies of the code; and
deploying, by the one or more computer processors, the container to one or more worker nodes using the slice network within the 5G network, the one or more worker nodes being one or more instances of an application environment that executes containers, and the deploying the container to the one or more worker nodes includes using a repository, the repository to store a plurality of containers available for distribution by a container distribution program, and the repository owned by a supplier of containers who independently enforces container usage contracts with the telecommunications carrier, the repository defined to accept, reject, log and monitor consumption of the plurality of containers within one or more bounds of a contractual arrangement with the telecommunications carrier, wherein the repository confirms that there is compliance with one or more agreed upon parameters.

2. The computer-implemented method of claim 1, wherein the deploying the container to the one or more worker nodes using the slice network within the 5G network comprises:
  sending, by the one or more computer processors, a new cluster information to a manager node, wherein the new cluster information describes the slice network within the 5G network;
  requesting, by the one or more computer processors, a container image of the container from the repository;
  receiving, by the one or more computer processors, a copy of the container image from the repository; and
  deploying, by the one or more computer processors, the copy of the container image to the one or more worker nodes using the slice network within the 5G network and the manager node.

3. The computer-implemented method of claim 2, wherein the request for the container image uses an out-of-band network that is separate from the 5G network.

4. The computer-implemented method of claim 1, wherein the deploying the container to the one or more worker nodes using the slice network within the 5G network comprises:
  requesting, by the one or more computer processors, a container image of the container from the repository, wherein the request includes a location of the one or more worker nodes; and
  receiving, by the one or more computer processors, a notification that the repository has deployed the container directly to the one or more worker nodes, wherein the container is deployed directly from the repository to the one or more worker nodes using the slice network within the 5G network.

5. The computer-implemented method of claim 4, wherein the repository acts as a manager node for deploying the container to the one or more worker nodes.

6. The computer-implemented method of claim 1, wherein the deploying the container to the one or more worker nodes using the slice network within the 5G network comprises:
  requesting, by the one or more computer processors, a delivery approval from the repository for a container image of the container;
  responsive to receiving the delivery approval, receiving, by the one or more computer processors, the container image from the repository, wherein the container image is received by a manager node; and
  deploying, by the one or more computer processors, the container image to the one or more worker nodes, wherein the container image is deployed by the manager node using the slice network within the 5G network.

7. The computer-implemented method of claim 6, wherein the container image is received from the repository using a container delivery 5G slice, and further wherein the container delivery 5G slice is a different slice than the slice network within the 5G network.

8. A computer program product comprising one or more computer readable storage mediums and program instructions stored on the one or more computer readable storage mediums, the program instructions including instructions to:
  responsive to receiving a request by a carrier to obtain and host a container within a 5G network, create a slice network within the 5G network for hosting of the container, wherein the slice network is created by the carrier for the 5G network, the carrier being a telecommunications carrier, and wherein the container comprises a standalone runtime environment including code and dependencies of the code; and
  deploy the container to one or more worker nodes using the slice network within the 5G network, the one or more worker nodes being one or more instances of an application environment that executes containers, and the deploy the container to the one or more worker nodes includes using a repository, the repository to store a plurality of containers available for distribution by a container distribution program, and the repository owned by a supplier of containers who independently enforces container usage contracts with the telecommunications carrier, the repository defined to accept, reject, log and monitor consumption of the plurality of containers within one or more bounds of a contractual arrangement with the telecommunications carrier, wherein the repository confirms that there is compliance with one or more agreed upon parameters.

9. The computer program product of claim 8, wherein the deploy the container to the one or more worker nodes using the slice network within the 5G network comprises one or more of the following program instructions, stored on the one or more computer readable storage mediums, to:
  send a new cluster information to a manager node, wherein the new cluster information describes the slice network within the 5G network;
  request a container image of the container from the repository;
  receive a copy of the container image from the repository; and
  deploy the copy of the container image to the one or more worker nodes using the slice network within the 5G network and the manager node.

10. The computer program product of claim 9, wherein the request for the container image uses an out-of-band network that is separate from the 5G network.

11. The computer program product of claim 8, wherein the deploy the container to the one or more worker nodes using the slice network within the 5G network comprises one or more of the following program instructions, stored on the one or more computer readable storage mediums, to:
  request a container image of the container from the repository, wherein the request includes a location of the one or more worker nodes; and
  receive a notification that the repository has deployed the container directly to the one or more worker nodes, wherein the container is deployed directly from the repository to the one or more worker nodes using the slice network within the 5G network.

12. The computer program product of claim 11, wherein the repository acts as a manager node for deploying the container to the one or more worker nodes.

13. The computer program product of claim 8, wherein the deploy the container to the one or more worker nodes using the slice network within the 5G network comprises one or more of the following program instructions, stored on the one or more computer readable storage mediums, to:
  request a delivery approval from the repository for a container image of the container;

responsive to receiving the delivery approval, receive the container image from the repository, wherein the container image is received by a manager node; and deploy the container image to the one or more worker nodes, wherein the container image is deployed by the manager node using the slice network within the 5G network.

14. The computer program product of claim 13, wherein the container image is received from the repository using a container delivery 5G slice, and further wherein the container delivery 5G slice is a different slice than the slice network within the 5G network.

15. A computer system comprising:
one or more computer processors;
one or more computer readable storage mediums; and
program instructions stored on the one or more computer readable storage mediums for execution by at least one of the one or more computer processors, the stored program instructions including instructions to:
responsive to receiving a request by a carrier to obtain and host a container within a 5G network, create a slice network within the 5G network for hosting of the container, wherein the slice network is created by the carrier for the 5G network, the carrier being a telecommunications carrier, and wherein the container comprises a standalone runtime environment including code and dependencies of the code; and
deploy the container to one or more worker nodes using the slice network within the 5G network, the one or more worker nodes being one or more instances of an application environment that executes containers, and the deploy the container to the one or more worker nodes includes using a repository, the repository to store a plurality of containers available for distribution by a container distribution program, and the repository owned by a supplier of containers who independently enforces container usage contracts with the telecommunications carrier, the repository defined to accept, reject, log and monitor consumption of the plurality of containers within one or more bounds of a contractual arrangement with the telecommunications carrier, wherein the repository confirms that there is compliance with one or more agreed upon parameters.

16. The computer system of claim 15, wherein the deploy the container to the one or more worker nodes using the slice network within the 5G network comprises one or more of the following program instructions, stored on the one or more computer readable storage mediums, to:
send a new cluster information to a manager node, wherein the new cluster information describes the slice network within the 5G network;
request a container image of the container from the repository; receive a copy of the container image from the repository; and
deploy the copy of the container image to the one or more worker nodes using the slice network within the 5G network and the manager node.

17. The computer system of claim 15, wherein the deploy the container to the one or more worker nodes using the slice network within the 5G network comprises one or more of the following program instructions, stored on the one or more computer readable storage mediums, to:
request a container image of the container from the repository, wherein the request includes a location of the one or more worker nodes; and
receive a notification that the repository has deployed the container directly to the one or more worker nodes, wherein the container is deployed directly from the repository to the one or more worker nodes using the slice network within the 5G network.

18. The computer system of claim 17, wherein the repository acts as a manager node for deploying the container to the one or more worker nodes.

19. The computer system of claim 15, wherein the deploy the container to the one or more worker nodes using the slice network within the 5G network comprises one or more of the following program instructions, stored on the one or more computer readable storage mediums, to:
request a delivery approval from the repository for a container image of the container;
responsive to receiving the delivery approval, receive the container image from the repository, wherein the container image is received by a manager node; and
deploy the container image to the one or more worker nodes, wherein the container image is deployed by the manager node using the slice network within the 5G network.

20. The computer-implemented method of claim 1, wherein the one or more agreed upon parameters include a permitted number of deployments, usage limitation agreements and functionality restrictions.

* * * * *